United States Patent
Wei et al.

(10) Patent No.: US 9,551,970 B2
(45) Date of Patent: Jan. 24, 2017

(54) PAPER SIZE DETECTION SYSTEM AND METHOD

(71) Applicant: HON HAI PRECISION INDUSTRY CO., LTD., New Taipei (TW)

(72) Inventors: Cheng-Lung Wei, New Taipei (TW); Yen-Hung Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/546,733

(22) Filed: Nov. 18, 2014

(65) Prior Publication Data

US 2016/0116878 A1    Apr. 28, 2016

(30) Foreign Application Priority Data

Oct. 28, 2014 (TW) .............................. 103137101 A

(51) Int. Cl.
*G03G 15/00* (2006.01)
*G01B 11/02* (2006.01)
*B41J 11/00* (2006.01)
*B41J 13/00* (2006.01)
*G01B 11/28* (2006.01)

(52) U.S. Cl.
CPC ........ *G03G 15/6505* (2013.01); *B41J 11/0095* (2013.01); *B41J 13/0054* (2013.01); *G01B 11/026* (2013.01); *G01B 11/285* (2013.01); *G01B 11/28* (2013.01); *G03G 2215/00734* (2013.01)

(58) Field of Classification Search
CPC ..... G01B 11/026; G01B 11/28; G01B 11/285; G01B 11/028; G01B 11/02; G01B 11/03; B41J 11/0095; B41J 13/0054; B65H 2511/10; G06K 15/4065
USPC .................................. 347/106, 16, 104, 19, 5
See application file for complete search history.

(56) References Cited

U.S. PATENT DOCUMENTS 5,573,236 A * 11/1996 Petocchi .................. B65H 1/00
  250/214 PR
2005/0133983 A1 * 6/2005 Jacobs .................... B65H 1/04
  271/145

* cited by examiner

*Primary Examiner* — Henok Legesse
(74) *Attorney, Agent, or Firm* — Zhigang Ma

(57) ABSTRACT

A paper size detection system includes a paper tray, a width adjuster, a length adjuster, a plurality of sensors, and a signal processor. The paper tray is configured to receive a printing paper and includes a blocking plate. Each of the width adjuster and the length adjuster is movably mounted to the paper tray. The width adjuster, the length adjuster, and the blocking plate cooperatively define a paper placing space with a size substantially equal to a size of the printing paper. The sensors are configured to get a position signal assembly according to positions of the width adjuster and the length adjuster. The signal processor is configured to confirm the size of the paper placing space according the position signal assembly. A paper size detection method is further disclosed.

13 Claims, 4 Drawing Sheets

| paper size | analog voltage | first position signal | second position signal |
|---|---|---|---|
| A(Letter) | 6V | 6X | 6Y |
| Legal | 5V | 5X | 5Y |
| B(Ledger) | 4V | 4X | 4Y |
| A5 | 3V | 3X | 3Y |
| A4 | 2V | 2X | 2Y |
| A3 | 1V | 1X | 1Y |

| paper size | analog voltage | first position signal | second position signal |
|---|---|---|---|
| A(Letter) | 6V | 6X | 6Y |
| Legal | 5V | 5X | 5Y |
| B(Ledger) | 4V | 4X | 4Y |
| A5 | 3V | 3X | 3Y |
| A4 | 2V | 2X | 2Y |
| A3 | 1V | 1X | 1Y |

FIG. 3

PAPER SIZE DETECTION SYSTEM AND METHOD

FIELD

The subject matter herein generally relates to detection systems and methods, and more particularly to a paper size detection system and method.

BACKGROUND

When printing use a printer, the size of paper in a paper tray is generally unknown unless opening the paper tray before printing.

BRIEF DESCRIPTION OF THE DRAWINGS

Implementations of the present technology will now be described, by way of example only, with reference to the attached figures.

FIG. 3 is a preset mapping table for paper sizes of the paper size detection system of FIG. 1.

DETAILED DESCRIPTION

Figure 1:
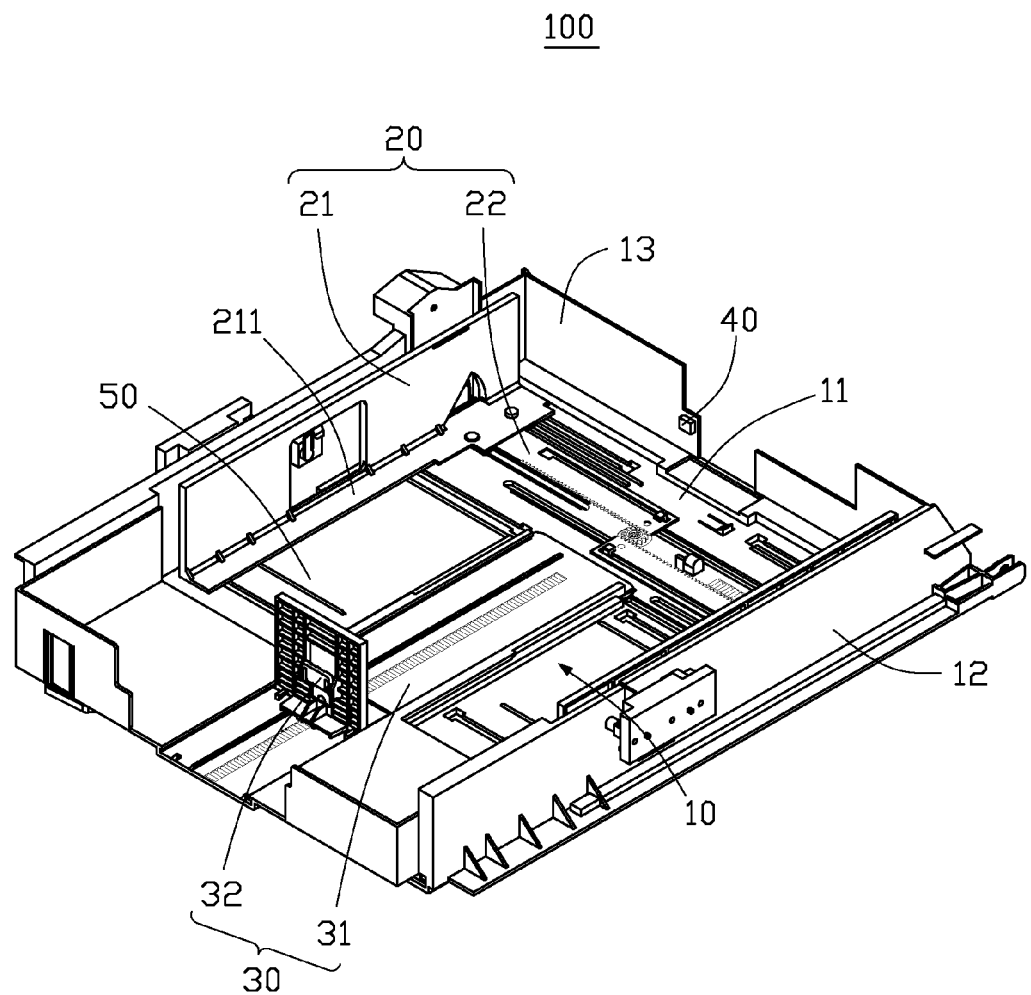
FIG. 1 is an assembled, isometric view of an embodiment of a paper size detection system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
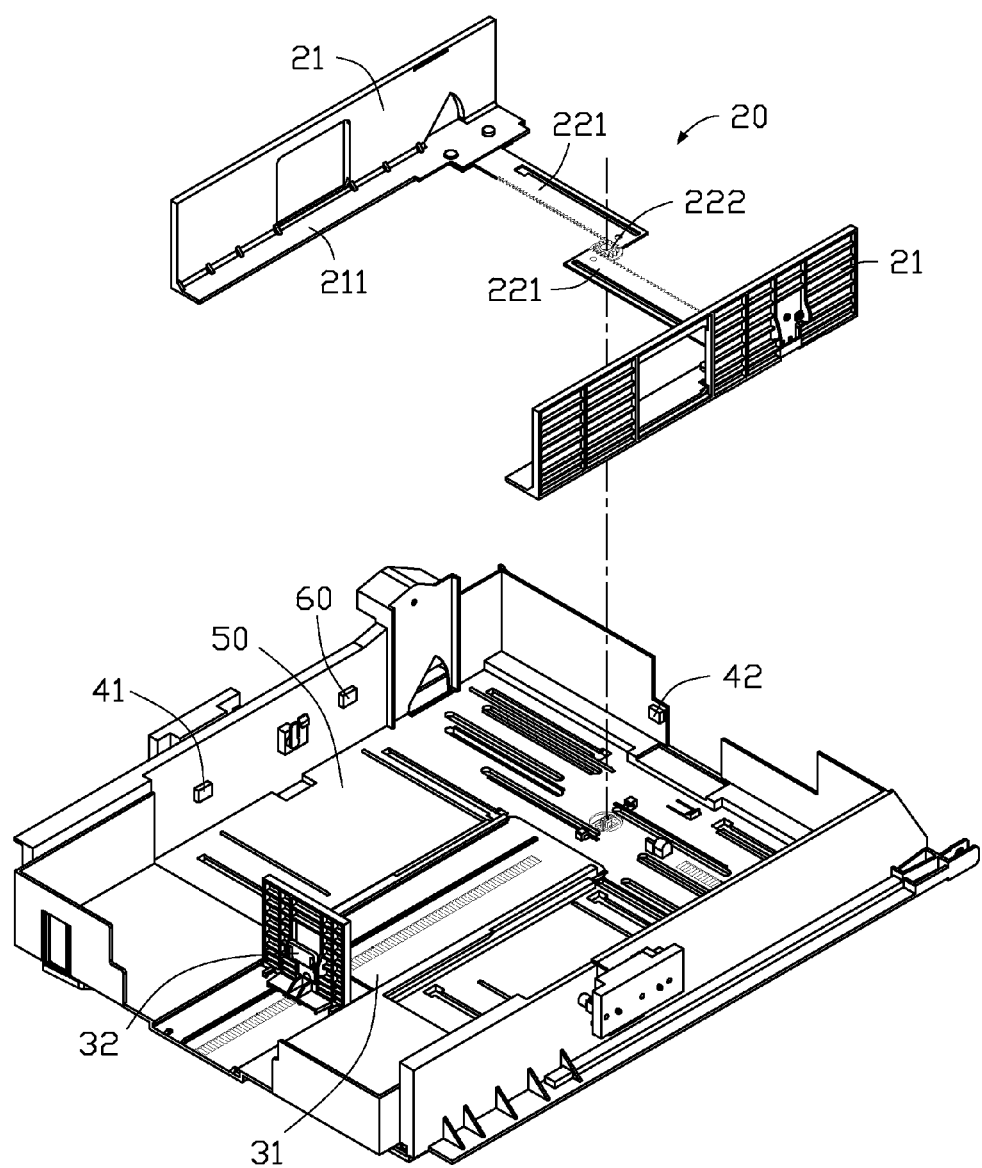
FIG. 2 is an exploded, isometric view of the paper size detection system of FIG. 1.

FIGS. 1 and 2 illustrate one embodiment of a paper size detection system. The paper size detection system 100 can include a paper tray 10, a width adjuster 20, a length adjuster 30, and two sensors 40.

The paper tray 10 can include a bottom plate 11, two side plates 12, and a blocking plate 13 extending from the bottom plate 11. In at least one embodiment, the two side plates 12 are substantially parallel to each other and substantially perpendicular to the bottom plate 11 and the blocking plate 13, and the blocking plate 13 is substantially perpendicular to the bottom plate 11.

The width adjuster 20, the length adjuster 30, and the blocking plate 13 cooperatively define a paper placing space 50. The width adjuster 20 is movable horizontally relative to the bottom plate 11 to adjust a width of the paper placing space 50. The length adjuster 30 is movable longitudinally relative to the bottom plate 11 to adjust a length of the paper placing space 50.

The width adjuster 20 can include two limiting plates 21 and a linkage assembly 22 connected between the two limiting plates 21. Each limiting plate 21 is substantially parallel to each side plate 12. A flange 211 perpendicularly extends from a bottom edge of each limiting plate 21. The flange 211 is substantially parallel to the bottom plate 11 and is slidable on the bottom plate 11. A distance between the two limiting plate 21 is the width of the paper placing space 50.

The linkage assembly 22 can include two racks 221 and a gear 222 geared with the two racks 221. The gear 222 is rotatable to move the two racks 221, so that the two limiting plates 21 are movable in a direction substantially perpendicular to each limiting plate 21 to adjust the width of the paper placing space 50.

The length adjuster 30 can include a sliding plate 31 and a pushing plate 32 slidably mounted to the sliding plate 31. The pushing plate 32 is slidable on the sliding plate 31 in a direction substantially parallel to each limiting plate 21 to adjust the length of the paper placing space 50.

The two sensors 40 are infrared sensors and can include a first sensor 41 and a second sensor 42. The first sensor 41 is mounted to one of the two side plates 12 and located between the two side plates 12. The first sensor 41 is operable to emit an infrared beam to the limiting plate 21 adjacent to the one of the two side plates 12. When the infrared beam is reflected back from the limiting plate 21, the first sensor 41 receives the reflected infrared beam to get a first position signal. The second sensor 42 is mounted to the blocking plate 13. The second sensor 42 is operable to emit an infrared beam to the pushing plate 32. When the infrared beam is reflected rack from the pushing plate 32, the second sensor 42 receives the reflected infrared beam to get a second position signal. The first position signal and the second position signal are composed to a position signal assembly.

The paper size detection system 100 can further include a signal processor 60. The signal processor 60 stores a mapping table for paper sizes to show correspondences one-to-one between each position signal assembly and a mapped paper size. The signal processor 60 can be secured to the one of the two side plates 12 or other positions.

FIG. 3 illustrates one embodiment of the mapping table. When the first position signal is 1x, and the second position signal is 1Y, the signal processor get a 1V analog voltage and sends out a paper size signal A3 after searching the mapped paper size with the 1V analog voltage.

Figure 4:
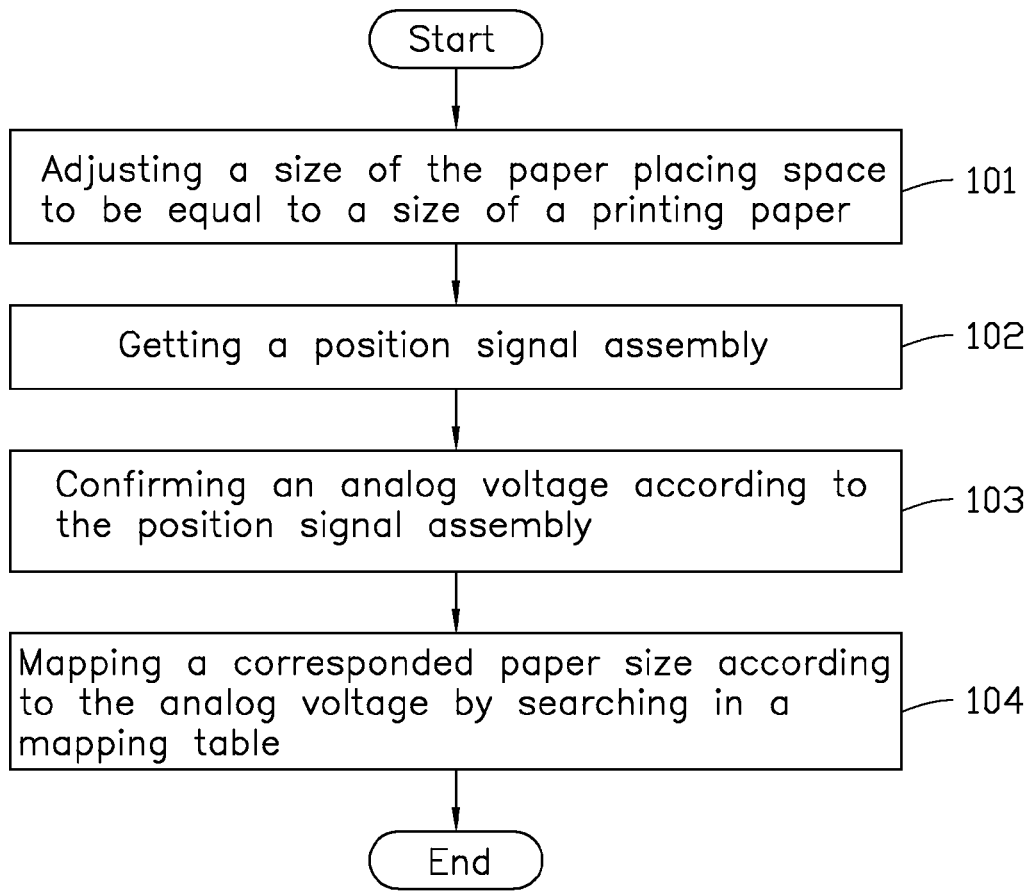
FIG. 4 is a flowchart of one embodiment of a paper size detection method.

Referring to FIG. 4, a flowchart is presented in accordance with an example embodiment. The example method is provided by way of example, as there are a variety of ways to carry out the method. The method described below can be carried out using the configurations illustrated in FIG. 4, for example, and various elements of these figures are referenced in explaining the example method. Each block shown in FIG. 4 represents one or more processes, methods or subroutines carried out in the example method. Furthermore, the illustrated order of blocks is illustrative only and the order of the blocks can change according to the present disclosure. Additional blocks can be added or fewer blocks may be utilized, without departing from this disclosure. The example method can begin at block 101.

At block 101, adjusting a size of the paper placing space 50 to be equal to a size of a printing paper by moving the width adjuster 20 and the length adjuster 30.

At block 102, confirming a first position signal by emitting a first infrared beam and receiving the reflected first infrared beam by the first sensor 41, and getting a second position signal by emitting a second infrared beam and receiving the reflected second infrared beam by the second sensor 42.

At block 103, getting an analog voltage according to a position signal assembly composed by the first position signal and the second position signal by the signal processor 60.

At block 104, mapping a corresponded paper size according to the analog voltage by searching in the mapping table.

The embodiments shown and described above are only examples. Many details are often found in the art such as the other features of a paper size detection system and method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A paper size detection system for measuring the length and width of paper available in a printer, the detection system comprising:
   a reloadable paper tray for receiving paper, the paper tray having;
   a bottom plate for supporting paper loaded in the paper tray;
   a blocking plate positioned at a first end of the paper tray and extending substantially perpendicular to the bottom plate;
   a first side plate, the first side plate positioned at a first side edge of the bottom plate substantially perpendicular to the blocking plate, and extending substantially perpendicular to the bottom plate; and
   a second side plate, positioned substantially opposite the first side plate at a second side edge of the bottom plate substantially perpendicular to the blocking plate and extending substantially perpendicular to the bottom plate;
   a width adjuster movably mounted to the paper tray and positioned between the first side plate and the second side plate substantially perpendicular to the bottom plate and the blocking plate;
   a length adjuster movably mounted to the paper tray and positioned substantially perpendicular to the bottom plate and the width adjuster, and positioned substantially parallel to the blocking plate;
   a plurality of sensors secured to the paper tray and comprising a first sensor and a second sensor; and
   a signal processor;
   wherein the width adjuster, the length adjuster, and the blocking plate cooperatively define a paper placing space with a size substantially equal to a size of the printing paper; the sensors are configured to get a position signal assembly according to positions of the width adjuster and the length adjuster; the signal processor is configured to confirm the size of the paper placing space according to the position signal assembly; and the first sensor is attached to one of the first side plate and the second side plate to sense the position of the width adjuster, and the second sensor is attached to the blocking plate to sense the position of the length adjuster.

2. The paper size detection system of claim 1, wherein the width adjuster comprises two limiting plates substantially perpendicular to the side plate, and a distance between the two limiting plates is substantially equal to a width of the paper placing space; the first sensor is configured to get a first position signal of the width adjuster by emitting a first infrared beam from one of the two limiting plates, adjacent to the one of the first side plate and the second side plate, and receiving the reflected first infrared beam back from.

3. The paper size detection system of claim 1, wherein the second sensor is configured to get a second position signal of the length adjuster by emitting a second infrared beam and receiving the reflected second infrared beam; and the first position signal and the second position signal are composed the position signal assembly.

4. The paper size detection system of claim 3, wherein the paper tray further comprises a pushing plate, the pushing plate is substantially parallel to the blocking plate, and a distance between the pushing plate and the blocking plate is substantially equal to a length of the paper placing space; and the second infrared beam is reflected back from the pushing plate.

5. The paper size detection system of claim 1, wherein the signal processor is further configured to get an analog voltage according to the position signal assembly and confirm the size of the paper placing space according the analog voltage.

6. The paper size detection system of claim 5, wherein the signal process stores a mapping table showing correspondences one-to-one between the analog voltage and a mapped paper size.

7. The paper size detection system of claim 6, wherein the signal process is configured to confirm the size of the paper placing space by searching the mapped paper size with the analog voltage in the mapping table.

8. A paper size detection system for measuring the length and width of paper available in a printer, the detection system comprising:
   a paper tray configured to receive a printing paper and comprising a blocking plate and a side plate substantially perpendicular to the blocking plate;
   a width adjuster movably mounted to the paper tray and having a width substantially equal to a width of the printing paper;
   a length adjuster movably mounted to the paper tray and having a length substantially equal to a length of the printing paper;
   a first sensor secured to the side plate and configured to get a first position signal according to a position of the width adjuster;
   a second sensor configured to get a second position signal according to a position of the length adjuster; and
   a signal processor;
   wherein the width adjuster, the length adjuster, and the blocking plate cooperatively define a paper placing space with a size substantially equal to a size of the printing paper; the signal processor is configured to confirm the size of the paper placing space according the first position signal and the second position signal; the first sensor is configured to get the first position signal of the width adjuster by emitting a first infrared beam and receiving the reflected first infrared beam; and the second sensor is secured to the blocking plate and configured to get the second position signal of the length adjuster by emitting a second infrared beam and receiving the reflected second infrared beam.

9. The paper size detection system of claim 8, wherein the signal processor is further configured to get an analog voltage according to the first position signal and the second position signal and confirm the size of the paper placing space according the analog voltage.

10. The paper size detection system of claim 9, wherein the signal process stores a mapping table showing correspondences one-to-one between the analog voltage and a mapped paper size.

11. The paper size detection system of claim 10, wherein the signal process is configured to confirm the size of the paper placing space by searching the mapped paper size with the analog voltage in the mapping table.

12. The paper size detection system of claim 8, wherein the width adjuster comprises two limiting plates substantially perpendicular to the side plate, and a distance between the two limiting plates is substantially equal to a width of the paper placing space; and the first infrared beam is reflected back from one of the two limiting plates adjacent to the side plate.

13. The paper size detection system of claim 8, wherein the paper tray further comprises a pushing plate, the pushing plate is substantially parallel to the blocking plate, and a distance between the pushing plate and the blocking plate is substantially equal to a length of the paper placing space; the second sensor is secured to the blocking plate, and the second infrared beam is reflected back from the pushing plate.

* * * * *